United States Patent
Kanehara et al.

(10) Patent No.: US 12,195,387 B2
(45) Date of Patent: Jan. 14, 2025

(54) CHEMICALLY STRENGTHENED GLASS ARTICLE AND MANUFACTURING METHOD THEREOF

(71) Applicant: AGC Inc., Tokyo (JP)

(72) Inventors: Kazuki Kanehara, Tokyo (JP); Kenji Imakita, Tokyo (JP)

(73) Assignee: AGC Inc., Tokyo (JP)

( * ) Notice: Subject to any disclaimer, the term of this patent is extended or adjusted under 35 U.S.C. 154(b) by 224 days.

(21) Appl. No.: 17/805,031

(22) Filed: Jun. 2, 2022

(65) Prior Publication Data

US 2022/0289625 A1 Sep. 15, 2022

Related U.S. Application Data

(63) Continuation of application No. PCT/JP2021/000250, filed on Jan. 6, 2021.

(30) Foreign Application Priority Data

Jan. 14, 2020 (JP) ................................ 2020-003802
Sep. 7, 2020 (JP) ................................ 2020-149919

(51) Int. Cl.
*C03C 21/00* (2006.01)
*C03C 3/085* (2006.01)
*C03C 3/095* (2006.01)

(52) U.S. Cl.
CPC ............ *C03C 21/002* (2013.01); *C03C 3/085* (2013.01); *C03C 3/095* (2013.01)

(58) Field of Classification Search
CPC ........ C03C 21/002; C03C 3/085; C03C 3/095
See application file for complete search history.

(56) References Cited

U.S. PATENT DOCUMENTS

| | | |
|---|---|---|
| 2012/0052271 A1 | 3/2012 | Gomez et al. |
| 2015/0030840 A1 | 1/2015 | Gomez et al. |
| 2017/0355640 A1 | 12/2017 | Oram et al. |
| 2019/0202730 A1 | 7/2019 | Gomez et al. |
| 2020/0109083 A1 | 4/2020 | Imakita et al. |
| 2021/0323863 A1 | 10/2021 | Oram et al. |
| 2021/0371332 A1 | 12/2021 | Ichimaru et al. |
| 2021/0387904 A1 | 12/2021 | Ichimaru et al. |

FOREIGN PATENT DOCUMENTS

| | | |
|---|---|---|
| JP | 2013-536155 A | 9/2013 |
| JP | 2019-517985 A | 6/2019 |
| WO | WO 2019/004124 A1 | 1/2019 |
| WO | WO 2020/075708 A1 | 4/2020 |

OTHER PUBLICATIONS

International Search Report issued Mar. 30, 2021 in PCT/JP2021/000250 filed on Jan. 6, 2021, 3 pages.

*Primary Examiner* — Joanna Pleszczynska
(74) *Attorney, Agent, or Firm* — Oblon, McClelland, Maier & Neustadt, L.L.P.

(57) ABSTRACT

A chemically strengthened glass article in which a compressive stress value on a first surface is 400 MPa or more, a compressive stress value at a depth $D_B$ with a maximum compressive stress value in the range $(0.05 \times t)$–$(0.15 \times t)$ μm is larger than the compressive stress value at a depth $D_A$ with a minimum compressive stress value in the range from the first surface to $D_B$, a tensile stress value at a depth of $(0.5 \times t)$ μm is 125 MPa or less, and a compressive stress layer depth is $(0.23 \times t)$ μm or more.

9 Claims, 3 Drawing Sheets

CHEMICALLY STRENGTHENED GLASS ARTICLE AND MANUFACTURING METHOD THEREOF

CROSS-REFERENCE TO RELATED APPLICATIONS

The present application is a continuation of International patent application PCT/JP2021/000250, filed Jan. 6, 2021, which is based on and claims the priority to Japanese Application No. 2020-003802, filed Jan. 14, 2020 and Japanese Application No. 2020-149919, filed Sep. 7, 2020. The entire contents of these applications are incorporated herein by reference.

TECHNICAL FIELD

The present invention relates to a chemically strengthened glass article.

BACKGROUND ART

Chemically strengthened glass is used for cover glasses of cellphone terminals.

Chemically strengthened glass is formed with a compressive stress layer in a surface portion of glass by causing ion exchange between alkali metal ions contained in the glass with alkali metal ions contained in a molten salt of sodium nitrate or the like and having a larger ion radius by bringing the glass in contact with the molten salt. The strength of the chemically strengthened glass is strongly depends on a stress profile indicating how the compressive stress value varies with respect to the depth (variable) from the glass surface.

Cover glasses of cellphone terminals etc. may be broken by deformation that occurs when, for example, they are dropped. To prevent such breaking, that is, bend-mode breaking, it is effective to increase the compressing stress at the glass surface.

On the other hand, cover glasses of cellphone terminals etc. may also be broken by collision with a projected thing when they are dropped onto an asphalt surface or grit. To prevent such breaking, that is, impact-mode breaking, it is effective to form a compressive stress layer to a deeper portion of the glass by increasing the compressive stress layer depth.

However, when a compressive stress layer is formed in a surface portion of a glass article, tensile stress necessarily occurs in a central portion of the glass article according to the compressive stress at the surface. If this tensile stress is too large, the glass article is broken violently to scatter fragments. Thus, chemically strengthened glass is designed so that the total amount of compressive stress in a surface layer does not become too large while a compressive stress layer is formed to a deeper portion by increasing the compressive stress at the surface.

Patent document 1 discloses a method in which a 2-step chemical strengthening is performed using alkali alumino-borosilicate glass containing lithium.

According to this method, large compressive stress can be formed in a surface portion of glass by sodium-potassium exchange and a little smaller compressive stress can be formed in a deeper portion by lithium-sodium exchange. It was considered that with these features both of bend-mode breaking and impact mode-breaking could be suppressed.

Patent document 2 discloses that chemically strengthened glass that is high in drop strength and less prone to scatter fragments when broken can be obtained by a 3-step ion exchange process.

CITATION LIST

Patent Literature

Patent document 1: JP-T-2013-536155 (The symbol "JP-T" as used herein means a published Japanese translation of a PCT patent application.)
Patent document 2: WO 2019-004124

SUMMARY OF INVENTION

Problems that the Invention is to Solve

Chemically strengthened glass disclosed in each of Patent documents 1 and 2 was sometimes insufficient in strength.

An object of the present invention is to provide a chemically strengthened glass article that is high in strength and is suppressed in scattering of fragments when broken.

Solution to Problem

The invention provides a chemically strengthened glass article having a first surface, a second surface that is opposed to the first surface, and end portions that are in contact with the first surface and the second surface, in which:
  a compressive stress value at the first surface is 400 MPa or larger;
  when a compressive stress value inside the glass is expressed with a depth from the first surface as a variable, a compressive stress value at a depth $D_B$ is larger than a compressive stress value at a depth $D_A$, provided that the depth $D_B$ is a depth at which a compressive stress value is maximum in a depth range, as measured from the first surface, of $(0.05 \times t)$ μm to $(0.15 \times t)$ μm where t (μm) is a glass thickness, and the depth $D_A$ is a depth at which a compressive stress value is minimum in a depth range from the first surface to the depth $D_B$;
  a tensile stress value at a depth $(0.5 \times t)$ μm from the first surface is 125 MPa or smaller; and
  a compressive stress layer depth is $(0.23 \times t)$ m or larger.

It is preferable that the chemically strengthened glass article include lithium aluminosilicate glass.

The invention also provides a manufacturing method of a chemically strengthened glass article, the method including:
  immersing a glass sheet including lithium aluminosilicate glass in a sodium-containing molten salt at 380° C. to 500° C. for 1 to 8 hours, the sodium-containing molten salt containing sodium ions at 50 mass % or higher with respect to a mass of metal ions in the molten salt regarded as 100%; and
  thereafter immersing the glass sheet in a lithium-containing molten salt.

Advantageous Effect of Invention

According to the invention, a chemically strengthened glass article can be obtained in which bend-mode breaking and impact-mode breaking are both sufficiently suppressed and scattering of fragments at the time of breaking is suppressed.

DESCRIPTION OF EMBODIMENT

Figure 1:
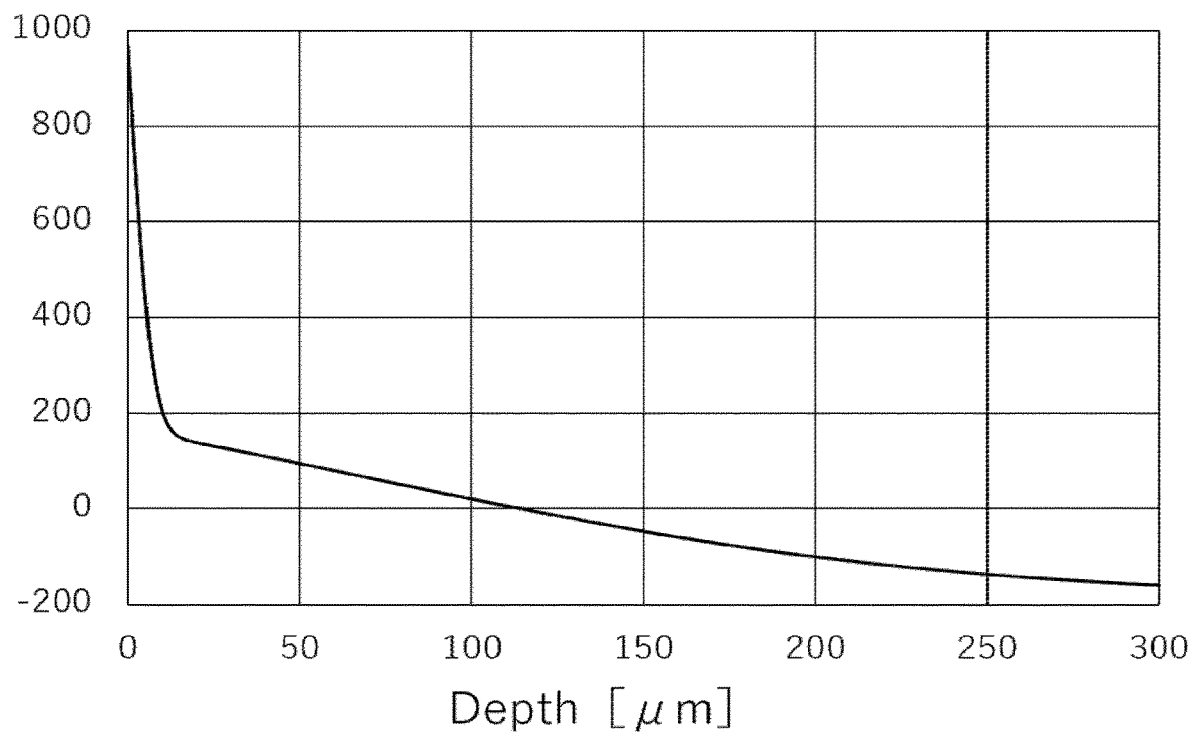
FIG. 1 is a graph showing a stress profile of a chemically strengthened glass article.

In this specification, the symbol "-" (or the word "to") is used to express a numerical range including the numerical values written before and after it as a lower limit value and an upper limit value, respectively, unless otherwise specified.

A stress profile can be measured by a method that uses an optical waveguiding surface stress meter and a birefringence stress meter in combination.

It is known that methods using an optical waveguiding surface stress meter can measure a stress of glass accurately in a short time. An example optical waveguiding surface stress meter is FSM-6000 produced by Orihara Industrial Co., Ltd. A highly accurate stress measurement can be performed by combining FSM-6000 with software Fsm-V attached to it.

However, in principle, optical waveguiding surface stress meters can measure stress only in a case that the refractive index decreases from the surface of a sample inward. In a chemically strengthened glass article, stress of a layer obtained by replacing sodium ions inside the glass with external potassium ions can be measured with an optical waveguiding surface stress meter because the refractive index decreases from the surface of a sample inward. However, stress of a layer obtained by replacing lithium ions inside the glass article with external sodium ions cannot be measured with an optical waveguiding surface stress meter. As a result, where a glass article containing lithium is subjected to ion exchange treatment using a molten salt containing sodium, a depth ($D_k$) where the compressive stress value becomes equal to 0 measured with an optical waveguiding surface stress meter is not a true compressive stress layer depth.

A method using a birefringence stress meter can measure stress irrespective of a refractive index distribution. An example birefringence stress meter is a birefringence imaging system Abrio-IM produced by CRi, Inc.

However, to measure stress with a birefringence stress meter, it is necessary to work a glass sample into a thin section. In particular, it is difficult to work an edge portion accurately. It is therefore difficult to measure a stress value in the vicinity of a glass surface correctly.

In this situation, a correct stress measurement is enabled by using these two kinds of measuring instruments, that is, an optical waveguiding surface stress meter and a birefringence stress meter, in combination.

In this specification, the term "chemically strengthened glass" means glass after being subjected to chemical strengthening treatment and the term "glass for chemical strengthening" means glass before being subjected to chemical strengthening treatment.

In this specification, the term "base composition of chemically strengthened glass" means a glass composition of glass for chemical strengthening and a glass composition in a portion that is deeper than a compressive stress layer depth DOL of chemically strengthened glass can be regarded identical to its base composition except for a case that it has been subjected to extreme ion exchange treatment.

In this specification, a glass composition is described in mass % in terms of oxides and mass % may be written simply as "%" unless otherwise specified. In this specification, mass % and wt % are the same in meaning.

In this specification, the expression "(glass) substantially does not contain" means that the content of a substance concerned is lower than or equal to an impurity level contained in a raw material or the like, that is, it is not contained intentionally. More specifically, for example, the content of the substance concerned is lower than 0.1%, for example.

<Chemically Strengthened Glass Article>

The chemically strengthened glass article according to the invention (hereinafter may also be referred to as the "present strengthened glass" or the "present strengthened glass article" has a first surface, a second surface that is opposed to the first surface, and end portions that are in contact with the first surface and the second surface. Whereas the present strengthened glass article usually has a flat sheet shape, it may have a curved shape.

In the present strengthened glass, the compressive stress value ($CS_0$) at the first surface is 400 MPa or larger, preferably 700 MPa or larger, even preferably 800 MPa or larger, further preferably 900 MPa or larger, even further preferably 950 MPa or larger, and particularly preferably 1,000 MPa or larger. Bend-mode breaking can be prevented more surely as $CS_0$ increases.

On the other hand, where the surface compressive stress value is too large, the present strengthened glass may chip at an edge portion after chemical strengthening. This phenomenon is sometimes called delayed chipping. From the viewpoint of preventing this phenomenon, it is preferable that $CS_0$ be 1,300 MPa or smaller, even preferably 1,200 MPa or smaller, and further preferably 1,000 MPa or smaller.

It is preferable that the sheet thickness (t) of the present strengthened glass article be 100 μm or larger, even preferably 200 μm or larger, further preferably 400 μm or larger, even further preferably 600 m or larger, and particularly preferably 700 m or larger. The present strengthened glass article becomes less prone to break as t increases. Where the present strengthened glass article is used for a cellphone terminal or the like, to decrease its weight, it is preferable that t be 2,000 μm or smaller and even preferably 1,000 μm or smaller.

According to the experiences of the inventors, the compressive stress layer depth (DOL) of chemically strengthened glass that is obtained by a common method is (0.21×t) m or smaller. This is because the total amount of compressive stress and the total amount of tensile stress balance in the entire glass sheet.

However, based on the following considerations and experiments, the present inventors thought that a profile that a compressive stress value around a depth 80 μm from the first surface is large and the width of a region having compressive stress is (0.23×t) μm or larger would be effective in suppressing impact-mode breaking. In this connection, it is supposed that the thickness t of the glass is 200 μm or larger. The thickness t of the glass is preferably 300 μm or larger and even preferably 350 μm or larger.

When a glass article is dropped onto an asphalt-paved road or grit, a crack may develop in it due to collision with a projected thing such as grit. It is known that the length of a crack developing at this time are about 80 μm though they depend on the size of the projected thing with which the glass article collided. Thus, the inventors thought that impact-mode breaking that the glass article fractures when hitting a relatively large projected thing could be prevented if it has a stress profile that a large compressive stress value exists around a depth 80 μm.

The inventors also thought that to prevent a glass article from breaking when it hits a large projected thing it is important that it has a large compressive stress layer depth (DOL).

The present strengthened glass article is characterized in that its DOL is larger than conventional chemically strengthened glass and a flaw is less prone to occur when it is dropped. The compressive stress layer depth (DOL) of the present strengthened glass article is preferably (t×0.23) μm or larger, even preferably (t×0.235) μm or larger, and further preferably (t×0.24) μm or larger. DOL that is large relative to t enhances the effect of chemical strengthening.

On the other hand, if DOL is too large relative to t, the internal tensile stress (CT) is increased and scattering of fragments becomes prone to occur at the time of breaking. Where t is 350 μm or larger, it is preferable that DOL be (t×0.26) μm or smaller, even preferably (t×0.255) μm or smaller. Where t is 400 μm or larger, it is even preferable that DOL be (t×0.25) μm or smaller DOL is preferably 80 μm or larger. When a glass particle is dropped onto a little rough asphalt-paved road, breaking due to impact of collision can be suppressed if DOL is 80 μm or larger.

In the present strengthened glass article, the depth, as measured from the first surface, of a point where a compressive stress value measured with an optical waveguiding surface stress meter is equal to zero is represented by $D_k$. Where the compressive stress value is larger than 0 at a depth $D_B$ from the first surface and is smaller than 0 at a depth $D_A$ from the first surface, there exist, in the region from the first surface to the depth $D_B$, two points of depth where the compressive stress value measured with an optical waveguiding surface stress meter is equal to zero. In this case, the depth $D_k$ is a depth from the first surface of a shallower one of the two points.

The depth $D_k$ being larger than or equal to 3 μm is preferable because bend-mode breaking can be prevented in this case. The depth $D_k$ is even preferably 4 μm or larger, further preferably 5 μm or larger. CT may become large if $D_k$ is too large. It is therefore preferable that $D_k$ be 20 μm or smaller, even preferably 15 μm or smaller and further preferably 10 μm or smaller.

$D_k$ and DOL usually have positive correlation, that is, DOL tends to increase with $D_k$.

Figure 2:
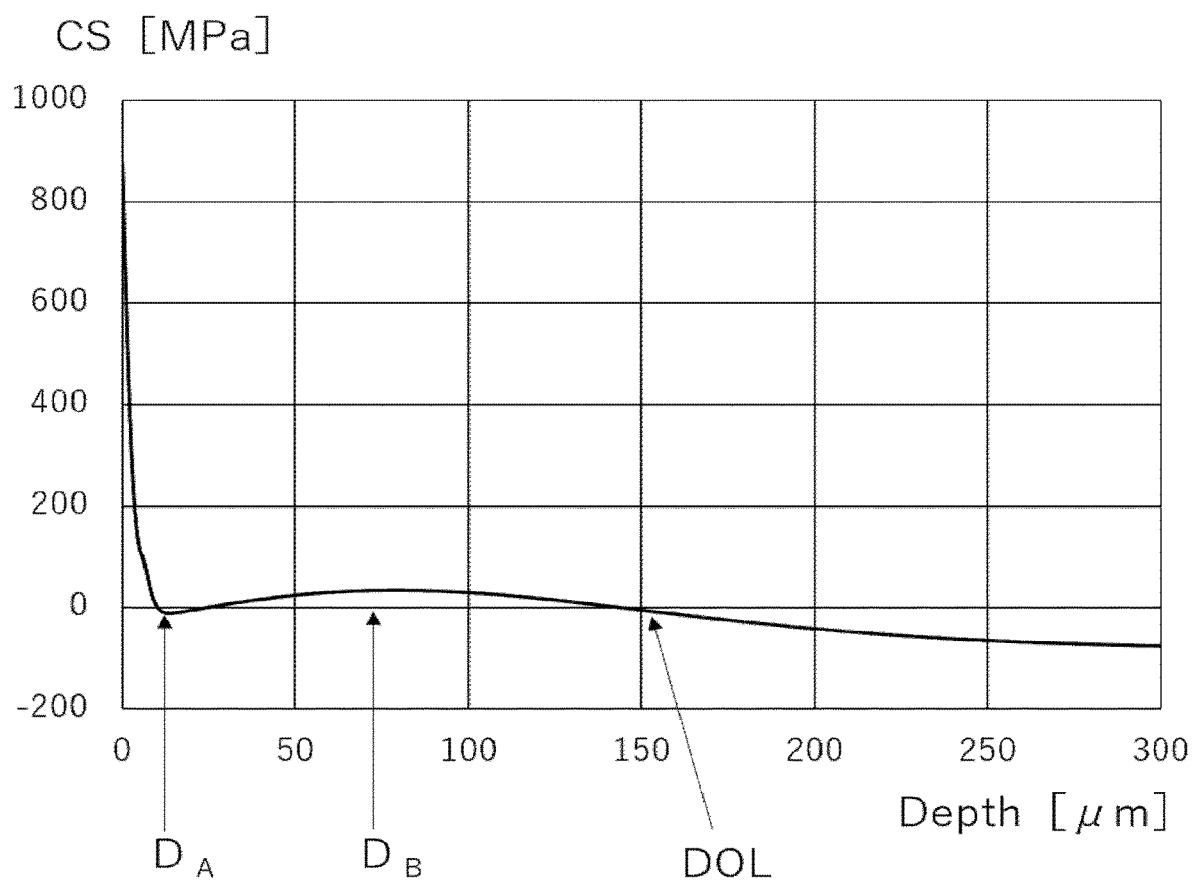
FIG. 2 is a graph showing a stress profile of a chemically strengthened glass article.

In the present strengthened glass article, as shown in FIG. 2, a depth at which the glass stress value is maximum in a depth range, as measured from the first surface, of (0.05×t) to (0.15×t) μm where t is the thickness of the present strengthened glass article is denoted by $D_B$ and the compressive stress value at the depth $D_B$ is represented by $CS_B$. A depth at which the compressive stress value is minimum in a depth range from the first surface to $D_B$ is denoted by $D_A$ and the compressive stress value at the depth $D_A$ is represented by $CS_A$. The thus-defined compressive stress values satisfy the following relationship;

$$CS_B > CS_A.$$

For example, in a typical conventional stress profile described in Patent document 1, as shown in FIG. 1, the compressive stress value (CS) decreases as the depth increases over the entire range from the glass surface to the center in the thickness direction. Thus, when the compressive stress value inside the glass is expressed with the depth from the first surface of the glass as a variable, a depth (i.e., a depth corresponding to $D_B$) at which the compressive stress value of the glass is maximum in the depth range of (0.05×t) to (0.15×t) μm is (0.05×t) μm. A depth (i.e., a depth corresponding to $D_A$) at which the compressive stress value of the glass is minimum in the depth range from the first surface of the glass to $D_B$ is also (0.05×t) μm. In this case, naturally, a relationship $CS_B = CS_A$ holds.

Figure 3:
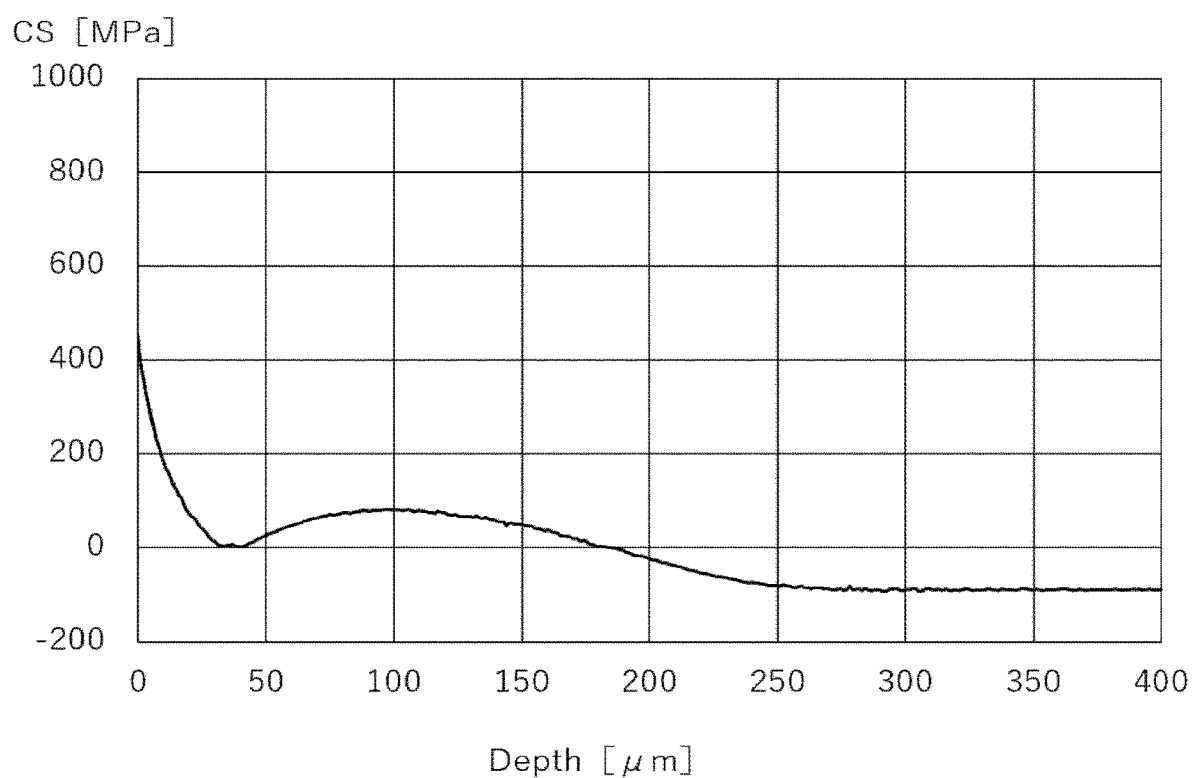
FIG. 3 is a graph showing a stress profile of a chemically strengthened glass article.

It is preferable that as shown in FIG. 3 a stress profile of the present strengthened glass article have a point of a local maximum compressive stress value in a depth range, as measured from the first surface, of 5 μm to DOL. In this case, the depth of the local maximum point as measured from the first surface is $D_B$. The stress profile has a point at which the compressive stress value takes a local minimum value in a depth range, as measured from the first surface, of 0 to $D_B$ and a depth of that local minimum point from the first surface is $D_A$. Since the stress profile has these local maximum point and local minimum point, a relationship $CS_B > CS_A$ holds.

In the present strengthened glass article, $CS_A$ is preferably −50 MPa or larger and even preferably larger than 0 MPa. According to studies of the present inventors, to prevent bend-mode breaking, it is important that the compressive stress value be large in a region where the depth from the first surface is relatively small; bend-mode breaking can be suppressed effectively when $CS_A$ is not too small. On the other hand, if $CS_A$ is too large, a large number of glass fragments occur when the glass is broken. Thus, $CS_A$ is preferably 200 MPa or smaller.

According to studies of the present inventors, to suppress impact-mode breaking, it is effective that the compressive stress value is large in a depth range, as measured from the first surface, of 50 to 80 μm. The present inventors thought that compressive stress values in a depth range, as measured from the first surface, of 10 μm or larger and smaller than 50 μm would not contribute to suppression of breaking very much. They therefore thought that to utilize compressive stress efficiently it would be useful to form a compressive stress local minimum point in the depth range, as measured from the first surface, of 10 μm or larger and smaller than 50 μm.

Thus, in the present strengthened glass, the depth $D_A$ of a local minimum point is preferably larger than or equal to 10 μm and smaller than 50 μm. $D_A$ is even preferably 15 μm or larger and further preferably 18 m or larger. The depth $D_A$ is even preferably smaller than 30 μm, further preferably 25 μm or smaller, and even further preferably 20 μm or smaller. It is supposed here that the glass thickness t is 200 μm or larger.

In the present strengthened glass article, it is preferable that a compressive stress value $CS_{80}$ at a depth 80 μm from the first surface be 50 MPa or larger because impact-mode breaking can be suppressed in this case. $CS_{80}$ is even preferably 60 MPa or larger. On the other hand, when a compressive stress layer is formed inside the glass, large tensile stress necessarily occurs in a central portion of the glass according to compressive stress at the surface. If this tensile stress value is too large, the glass article is broken violently to scatter fragments at the time of fracture. Thus, the compressive stress value $CS_{80}$ is preferably 200 MPa or smaller and even preferably 150 MPa or smaller. These compressive stress values are values measured by a birefringence stress meter. And it is supposed that the thickness t of the glass is 200 μm or larger.

In the present strengthened glass article, it is preferable that the compressive stress value $CS_{80}$ at the depth 80 μm from the first surface of the glass article be (t×0.1) MPa or larger where t (jam) is the glass thickness. To suppress impact-mode breaking, it is more preferable as $CS_{80}$ is large. To prevent fracturing while suppressing bend-mode breaking, it is preferable to balance them according to the thickness t. It is supposed that the thickness t of the glass is 200 μm or larger.

In the present strengthened glass article, a tensile stress value CT at a depth (0.5×t) μm from the first surface of the glass article is 125 MPa or smaller, in which case violent fracture is less prone to occur. The depth (0.5×t) μm corresponds to the center in the glass thickness direction and a tensile stress value at that depth means a tensile stress value inside the glass.

The tensile stress value is preferably 110 MPa or smaller and even preferably 100 MPa or smaller. To realize strengthening that is enough to make the glass not prone to break when dropped, the tensile stress value is preferably 50 MPa or larger and even preferably 75 MPa or larger.

It is preferable that the present strengthened glass article include lithium aluminosilicate glass.

In lithium aluminosilicate glass, it is possible to produce large compressive stress in a surface portion of the glass by sodium-potassium exchange and produce a little small compressive stress in a deeper portion by lithium-sodium exchange. As such, lithium aluminosilicate glass is considered to be able to suppress both of bend-mode breaking and collision-mode breaking due to collision with a projected thing.

In the present strengthened glass article, it is preferable that its glass composition in a central portion in the thickness direction, that is, its base composition, include, in mass %,
$SiO_2$ at 50% or higher;
$Al_2O_3$ at 5% or higher; and
$Li_2O$, $Na_2O$ and $K_2O$ at 5% or higher in total, and
that a mole ratio of $Li_2O$ to a total content of $Li_2O$, $Na_2O$, and $K_2O$ (i.e., $Li_2O/(Li_2O+Na_2O+K_2O)$) be 0.5 or larger.

It is even preferable that the glass composition in a central portion in the thickness direction be,
$SiO_2$: 50% to 70%;
$Al_2O_3$: 5% to 30%;
$B_2O_3$: 0% to 10%;
$P_2O_5$: 0% to 10%;
$Y_2O_3$: 0% to 10%;
$Li_2O$: 3% to 15%;
$Na_2O$: 0% to 10%;
$K_2O$: 0% to 10%;
(MgO+CaO+SrO+BaO): 0% to 10%; and
($ZrO_2+TiO_2$): 0% to 5%.

Since the glass composition in a central portion in the thickness direction can be regarded as the same as that of glass for chemical strengthening, the details of this preferable glass composition will be described in a section of glass for chemical strengthening.

The chemically strengthened glass article according to the invention is particularly useful when used as a cover glass for, for example, mobile devices such as cellphones and smartphones. It is also useful when used as a cover glass for display devices that are not required to be portable such as TV receivers, personal computers, and touch panels as well as for wall surfaces of elevators and wall surfaces of constructions such as houses and buildings (as full-surface displays). Furthermore, it is useful when used as a building material such as a window glass, a table top, part of an interior article or the like of an automobile, an airplane, or the like or a cover glass thereof, or part of a casing or the like having a curved shape.

<Manufacturing Method of Chemically Strengthened Glass Article>

The present strengthened glass article can be manufactured by performing ion exchange treatment on a glass for chemical strengthening article described below.

Glass for chemical strengthening can be manufactured by, for example, a common glass manufacturing method described below.

Glass materials are mixed as appropriate so as to obtain glass having a preferable composition and are heat-melted in a glass melting furnace. Resulting molten glass is homogenized by bubbling, stirring, addition of a refining agent, etc., shaped into a glass sheet having a prescribed thickness, and cooled gradually. Alternatively, homogenized molten glass may be shaped into glass sheets by forming it into a block shape, cooling the glass block gradually, and cutting it.

Example methods of shaping into a sheet shape are a float method, a press method, a fusion method, and a down draw method. In particular, to manufacture a large glass sheet, employment of the float method is preferable. Continuous shaping methods other than the float method, such as the fusion method and the down draw method, are also preferable.

A glass sheet is formed by, if necessary, grinding and polishing a glass ribbon obtained by shaping. Where a glass sheet is to be cut into a prescribed shape or size or chamfered, cutting or chamfering the glass sheet before subjecting it to chemical strengthening treatment (described later) is preferable because resulting end surfaces are also formed with a compressive stress layer by the chemical strengthening treatment.

The thus-shaped glass sheet is subjected to the chemical strengthening treatment and then cleaned and dried, whereby chemically strengthened glass is obtained.

The chemical strengthening treatment is treatment of replacing metal ions having a small ion radius (typically, lithium ions or sodium ions) in glass with metal ions having a large ion radius (typically, sodium ions or potassium ions for lithium ions and potassium ions for sodium ions) in a metal salt by contacting the glass with the metal salt by, for example, a method of immersing target glass in a melt of the metal salt (e.g., potassium nitrate) containing metal ions having a large ion radius (typically, sodium ions or potassium ions). However, the invention also utilizes an action of replacing metal ions having a large ion radius (potassium ions) in the glass with metal ions having a small ion radius (sodium ions) in a metal salt.

The method utilizing "Li—Na exchange" of replacing lithium ions in the glass with sodium ions is preferable because of a high rate of chemical strengthening treatment. To produce large compressive stress by ion exchange, it is preferable to utilize "Na—K exchange" of replacing sodium ions in the glass with potassium ions. To form a stress profile having a positive gradient in a depth region, as measured from the first surface, of 10 to 80 μm, it is preferable to utilize "Na—Li exchange" of replacing sodium ions once introduced into the glass with lithium ions in a molten salt. The stress profile having a positive gradient in a depth region, as measured from the first surface, of 10 to 80 μm has the same meaning as a stress profile that satisfies the above-mentioned relationship $CS_B > CS_A$.

Example molten salts to be used for the chemical strengthening treatment are nitrate salts, sulfate salts, carbonate salts, and chloride salts. Among these kinds of molten salts, example nitrate salts are lithium nitrate, sodium nitrate, potassium nitrate, cesium nitrate, and silver nitrate.

Example sulfate salts are lithium sulfate, sodium sulfate, potassium sulfate, cesium sulfate, and silver sulfate. Example carbonates are lithium carbonate, sodium carbonate, and potassium carbonate. Example chlorides are lithium chloride, sodium chloride, potassium chloride, cesium chloride, and silver chloride. These molten salts may be used either singly or as a combination of plural kinds.

More specifically, the present strengthened glass article can be manufactured by a strengthening treatment method described below (hereinafter referred to as a present strengthening treatment method).

The present strengthening treatment method has a step of immersing a glass sheet in a sodium-containing strengthening molten salt (hereinafter also referred to as a "sodium-containing strengthening salt"). A large compressive stress layer can be formed in a deep layer of the glass by executing this process. Compressive stress produced in the vicinity of the first surface is comparable with compressive stress produced in the vicinity of the second surface which is opposed to the first surface.

It is preferable that the sodium-containing strengthening salt contain sodium ions at 50 mass % or higher, even preferably 75 mass % or higher, with the mass of metal ions contained in the strengthening salt regarded as 100 mass %. The sodium-containing strengthening salt may contain lithium ions. To obtain sufficient compressive stress, it is preferable that the content of lithium ions be 1 mass % or lower, even preferably 0.5 mass % or lower.

To sufficiently suppress bending stress that occurs in glass when it receives drop impact, it is preferable that the sodium-containing strengthening salt contain potassium ions. From the viewpoint of features relating to the ease of handling such as the boiling temperature and danger, it is preferable that the sodium-containing strengthening salt be sodium-containing nitrate salt.

The present strengthening treatment method has a step of subsequently immersing the glass sheet in a lithium-containing molten salt (hereinafter also referred to as a "lithium-containing strengthening salt"). A stress profile having a positive gradient in a depth region, as measured from the first surface, of 10 to 80 μm can be obtained by executing this process.

It is preferable that the lithium-containing strengthening salt contain lithium ions at 0.5 mass % or higher, even preferably 1 mass % or higher, with the mass of metal ions contained in the strengthening salt regarded as 100 mass %. On the other hand, sufficient chemically strengthening stress is not produced in glass if the content of lithium ions in the strengthening salt is too high. Thus, the content of lithium ions is preferably 15 mass % or lower and even preferably 10 mass % or lower.

It is preferable that the lithium-containing strengthening salt contain sodium nitrate. The lithium-containing strengthening salt may contain, as components other than sodium nitrate, nitrates of an alkali metal(s) or an alkaline earth metal(s) such as potassium nitrate, magnesium nitrate, and lithium nitrate.

Where the lithium-containing strengthening salt does not contain sodium, it is preferable that it contain potassium, even preferably contain potassium nitrate. More specifically, it is preferable that the salt contain potassium ions at 80 mass % or higher, even preferably 85 mass % or higher, and further preferably 90 mass % or higher. Where the lithium-containing strengthening salt contains potassium at 80 mass % or higher, there may occur a case that a process of immersing the glass sheet in a potassium-containing molten salt (hereinafter also referred to as a "potassium-containing strengthening salt") described later can be omitted.

In the present strengthening treatment method, it is preferable to immerse the glass sheet in a sodium-containing strengthening salt at 380° C. to 500° C. It is preferable that the temperature of the sodium-containing strengthening salt be 380° C. or higher because this condition allows the ion exchange to proceed more easily. A temperature being 400° C. or higher is even preferable. On the other hand, it is preferable that the temperature of the sodium-containing strengthening salt be 500° C. or lower because this condition can suppress excessive stress relaxation in a surface layer. A temperature being 480° C. or lower is even preferable.

It is preferable that the time for which the glass sheet is immersed in the sodium-containing strengthening salt be 1 hour or longer because this condition increases the surface compressive stress. The immersion time is even preferably 2 hours or longer and further preferably 3 hours or longer. Where the immersion time is too long, not only the productivity lowers but also the compressive stress may decrease due to a relaxation phenomenon. To increase the compressive stress, it is preferable that the immersion time be 8 hours or shorter, even preferably 6 hours or shorter, and further preferably 4 hours or shorter.

In the present strengthening treatment method, it is preferable to subsequently immerse the glass sheet in a lithium-containing strengthening salt at 350° C. to 500° C. It is preferable that the temperature of the lithium-containing strengthening salt be 350° C. or higher because this condition can shorten the processing time. The temperature is even preferably 360° C. or higher and further preferably 380° C. or higher. On the other hand, it is preferable that the temperature of the lithium-containing strengthening salt be 500° C. or lower because this condition can suppress the relaxation of compressive stress due to heat. The temperature is even preferably 450° C. or lower and further preferably 425° C. or lower.

It is preferable that the time for which the glass sheet is immersed in the lithium-containing strengthening salt be 10 minutes or longer because this condition makes it possible to manufacture highly strong glass by sufficiently decreasing the stress in a region that is distant from the surface by 10 to 50 μm. The immersion time is even preferably 20 minutes or longer and further preferably 30 minutes or longer. Where the immersion time is too long, important stress in a region that is distant from the surface by 50 μm or more may become so weak that sufficient drop strength cannot be obtained. To obtain sufficient drop strength, it is preferable that the immersion time be 120 minutes or shorter, even preferably 90 minutes or shorter, and further preferably 60 minutes or shorter.

The present strengthening treatment method may further have a process of immersing the glass sheet in a potassium-containing strengthening salt or a process of immersing the glass sheet in a sodium-containing strengthening salt again. It is preferable that the potassium-containing strengthening salt contain potassium ions at 50 mass % or higher, even preferably 75 mass % or higher, with the mass of metal ions contained in the strengthening salt regarded as 100 mass %. The sodium-containing strengthening salt may be one that is the same as or similar to the sodium-containing strengthening salt described above.

The use of such a strengthening salt makes it possible to form a highly compressed stress layer as a surface layer of the glass and hence to suppress bend-mode glass breaking. It is preferable that the potassium-containing strengthening salt be a potassium-containing nitrate salt from the viewpoint of features relating to the ease of handling such as the boiling temperature and danger.

From the viewpoint of forming a highly compressed stress layer, it is preferable that the time for which the glass sheet is immersed in the potassium-containing strengthening salt or the sodium-containing strengthening salt be 1 minute or longer, even preferably 2 minutes or longer and further preferably 3 minutes or longer. From the viewpoint of preventing dispersion of deep layer stress, it is preferable that the immersion time be 10 minutes or shorter, even preferably 8 minutes or shorter and further preferably 6 minutes or shorter.

After the glass sheet is immersed in the sodium-containing strengthening salt and the lithium-containing strengthening salt and, if desired, in the potassium-containing strengthening salt or the sodium-containing strengthening salt, it is preferable that the temperature of the glass sheet be kept at 300° C. or lower. This is because if the temperature becomes higher than 300° C., the compressive stress that has been produced by the ion exchange processes is decreased by a relaxation phenomenon. The temperature at which the glass sheet is kept after it is immersed in the lithium-containing strengthening salt or the potassium-containing strengthening salt is even preferably 250° C. or lower and further preferably 200° C. or lower.

<Glass for Chemical Strengthening>

It is preferable that the glass for chemical strengthening employed in the invention (hereinafter may be referred to as "present glass for strengthening") be lithium aluminosilicate glass. More specifically, it is preferable that the glass for chemical strengthening include:

$SiO_2$ at 50% or higher;
$Al_2O_3$ at 5% or higher; and
$Li_2O$, $Na_2O$, and $K_2O$ at 5% or higher in total, and that a mole ratio of $Li_2O$ to a total content of $Li_2O$, $Na_2O$, and $K_2O$ (i.e., $Li_2O/(Li_2O+Na_2O+K_2O)$) be 0.5 or larger.

It is even preferable that the present glass for strengthening include, in mass % in terms of oxides, $SiO_2$ at 50% to 70%;
$Al_2O_3$ at 5% to 30%;
$B_2O$; at 0% to 10%;
$P_2O_5$ at 0% to 10%;
$Y_2O_3$ at 0% to 10%;
$Li_2O$ at 3% to 15%;
$Na_2O$ at 0% to 10%;
$K_2O$ at 0% to 10%;
(MgO+CaO+SrO+BaO) at 0% to 10%; and
($ZrO_2+TiO_2$) at 0% to 5%.

Glass having the above composition allows a preferable stress profile to be formed therein easily by a chemical strengthening process. This preferable glass composition will be described later.

$SiO_2$ is a component that constitutes a glass network. $SiO_2$ is also a component for increasing the chemical durability as well as a component for lowering the probability of occurrence of a crack when the glass surface is scratched. The content of $SiO_2$ is preferably 50% or higher, even preferably 55% or higher, further preferably 58% or higher, and even further preferably 60% or higher.

To increase the glass meltability, it is preferable that the content of $SiO_2$ be 80% or lower, even preferably 75% or lower, and further preferably 70% or lower.

$Al_2O_3$ is a component that is effective in increasing the ion exchangeability at the time of chemical strengthening and increasing surface compressive stress obtained by the strengthening. $Al_2O_3$ is also a component for increasing the glass transition temperature (Tg) and increasing the Young's modulus. The content of $Al_2O_3$ is preferably 5% or higher, even preferably 7% or higher, and further preferably 13% or higher.

To increasing the meltability, it is preferable that the content of $Al_2O_3$ be 30% or lower, even preferably 25% or lower, further preferably 23% or lower, and even further preferably 20% or lower.

$Li_2O$ is a component for producing surface compressive stress by ion exchange and is an indispensable component of lithium aluminosilicate glass. Chemically strengthened glass having a preferable stress profile can be obtained by chemically strengthening lithium aluminosilicate glass. To obtain a large compressive stress layer depth DOL, it is preferable that the content of $Li_2O$ be 2% or higher, even preferably 3% or higher and further preferably 5% or higher.

To prevent devitrification during glass manufacture or at the time of bending, it is preferable that the content of $Li_2O$ be 15% or lower, even preferably 10% or lower and further preferably 8% or lower.

$K_2O$ is a component for increasing the glass meltability and is also a component for obtaining high glass workability. $K_2O$ need not always be contained. Where $K_2O$ is contained, it is preferable that its content be 0.5% or higher and even preferably 1% or higher.

If the content of $K_2O$ is too high, tensile stress is produced by ion exchange treatment to possibly cause a crack. To prevent development of a crack, it is preferable that the content of $K_2O$ be 10% or lower, even preferably 8% or lower, further preferably 6% or lower, and particularly preferably 5% or lower.

$Na_2O$ is a component for forming a surface compressive stress layer by ion exchange using a molten salt containing potassium and is also a component for increasing the glass meltability. $Na_2O$ need not always be contained. Where $Na_2O$ is contained, it is preferable that its content be 0.5% or higher, even preferably 1% or higher, and further preferably 1.5% or higher.

The content $Na_2O$ is preferably 10% or lower, even preferably 8% or lower, and further preferably 6% or lower.

Each of alkali metal oxides (hereinafter may be written as $R_2O$) such as $Li_2O$, $Na_2O$, and $K_2O$ is a component for lowering the glass melting temperature, and it is preferable that they be contained at 5% or higher in total. The total content of $Li_2O$, $Na_2O$, and $K_2O$, that is, ($Li_2O+Na_2O+K_2O$), is preferably 5% or higher, even preferably 7% or higher, and further preferably 8% or higher.

To maintain the glass strength, it is preferable that ($Li_2O+Na_2O+K_2O$) be 20% or lower, even preferably 18% or lower.

It is preferable that the ratio of the number of moles of $Li_2O$ to the total number of moles of $Li_2O$, $Na_2O$, and $K_2O$, that is, $[Li_2O]/([Li_2O]+[Na_2O]+[K_2O])$ be 0.5 or larger because this condition makes it possible to produce large compressive stress in the glass at the time of chemical strengthening. It is even preferable that this mole ratio be 0.6 or larger.

Whereas each of MgO, CaO, SrO, and BaO is a component for increasing the glass meltability, it tends to lower the ion exchange performance.

The total content of MgO, CaO, SrO, and BaO, that is, (MgO+CaO+SrO+BaO), is preferably 15% or lower, even preferably 10% or lower, and further preferably 5% or lower.

MgO, CaO, SrO, and BaO need not always be contained. Where at least one of them is contained, it is preferable that their total content (MgO+CaO+SrO+BaO) be 0.1% or higher, even preferably 0.5% or higher. Where at least one of them is contained, it is preferable that MgO be contained to increase the strength of chemically strengthened glass.

Where MgO is contained, it is preferable that its content be 0.1% or higher, even preferably 0.5% or higher.

To enhance the ion exchange performance, it is preferable that the content of MgO be 10% or lower, even preferably 8% or lower.

Where CaO is contained, it is preferable that its content be 0.5% or higher, even preferably 1% or higher. To enhance the ion exchange performance, it is preferable that the content of CaO be 5% or lower, even preferably 3% or lower.

Where SrO is contained, it is preferable that its content be 0.5% or higher, even preferably 1% or higher. To enhance the ion exchange performance, it is preferable that the content of SrO be 5% or lower, even preferably 3% or lower.

Where BaO is contained, it is preferable that its content be 0.5% or higher, even preferably 1% or higher. To enhance the ion exchange performance, it is preferable that the content of BaO be 5% or lower, even preferably 1% or lower. It is further preferable that substantially no BaO be contained.

ZnO is a component for increasing the glass meltability and may be contained. Where ZnO is contained, it is preferable that its content be 0.2% or higher, and even preferably 0.5% or higher. To enhance the glass weatherability, it is preferable that the content of ZnO be 5% or lower, even preferably 3% or lower.

$TiO_2$ is a component for increasing the surface compressive stress that is produced by ion exchange, and may be contained. Where $TiO_2$ is contained, it is preferable that its content be 0.1% or higher. To suppress devitrification at the time of melting, it is preferable that the content of $TiO_2$ be 5% or lower, even preferably 1% or lower. It is further preferable that substantially no $TiO_2$ be contained.

$ZrO_2$ is a component for increasing the surface compressive stress that is produced by ion exchange, and may be contained. Where $ZrO_2$ is contained, it is preferable that its content be 0.5% or higher, even preferably 1% or higher. To suppress devitrification at the time of melting, it is preferable that the content of $ZrO_2$ be 5% or lower, even preferably 3% or lower.

The total content of $TiO_2$ and $ZrO_2$, that is, $(TiO_2+ZrO_2)$, is preferably 5% or lower and even preferably 3% or lower. Neither $TiO_2$ nor $ZrO_2$ may be contained. Where $TiO_2$ and/or $ZrO_2$ is contained, it is preferable that their total content be 1% or higher.

$Y_2O_3$ is a component for increasing the glass strength and may be contained. Where $Y_2O_3$ is contained, it is preferable that its content be 0.2% or higher, even preferably 0.5% or higher, further preferably 1% or higher, even further preferably 1.5% or higher, and particularly preferably 2% or higher. To make glass devitrification less prone to occur at the time of melting and thereby prevent quality degradation of chemically strengthened glass, it is preferable that the content of $Y_2O_3$ be 10% or lower, even preferably 8% or lower, further preferably 7% or lower, even further preferably 6% or lower, even still further preferably 5% or lower, particularly preferably 4% or lower, and most preferably 3% or lower.

$La_2O_3$ and $Nb_2O_5$ are components for suppressing fracture of a chemically strengthened glass article and may be contained. Where they are contained, it is preferable that the content of each of them be 0.5% or higher, even preferably 1% or higher, further preferably 1.5% or higher, and particularly preferably 2% or higher.

The total content of $Y_2O_3$, $La_2O_3$, and $Nb_2O_5$ is preferably 10% or lower, even preferably 9% or lower, and further preferably 8% or lower. This condition makes glass devitrification less prone to occur at the time of melting and thereby prevent quality degradation of chemically strengthened glass. The content of each of $La_2O_3$ and $Nb_2O_5$ is preferably 10% or lower, even preferably 7% or lower, further preferably 6% or lower, even further preferably 5% or lower, particularly preferably 4% or lower, and most preferably 3% or lower.

$Ta_2O_5$ and $Gd_2O_3$ may be contained by a small amount to suppress fracture of chemically strengthened glass. However, increase in refractive index and reflectance is expected, it is preferable that the content of each of them be 1% or lower, even preferably 0.5% or lower. It is further preferable that substantially no $Ta_2O_5$ or $Gd_2O_3$ be contained.

$B_2O_3$ may be added to, for example, increase the meltability during glass manufacture. To decrease the gradient of a stress profile in the vicinity of the surface of chemically strengthened glass, it is preferable that the content of $B_2O_3$ be 0.5% or higher, even preferably 1% or higher and further preferably 2% or higher.

$B_2O_3$ is a component that causes stress relaxation to occur more easily after chemical strengthening. Thus, to prevent reduction of surface compressive stress due to stress relaxation, it is preferable that the content of $B_2O_3$ be 10% or lower, even preferably 8% or lower, further preferably 5% or lower, and most preferably 3% or lower.

$P_2O_5$ may be contained to increase the ion exchange performance. Where $P_2O_5$ is contained, it is preferable that its content be 0.5% or higher, even preferably 1% or higher. To increase the chemical durability, it is preferable that the content of $P_2O_5$ be 10% or lower, even preferably 5% or lower and further preferably 3% or lower.

To color the glass, a coloring component(s) may be added in such a range as not to obstruct the attainment of desired chemical strengthening properties. Example coloring components are $Co_3O_4$, $MnO_2$, $Fe_2O_3$, NiO, CuO, $Cr_2O_3$, $V_2O_5$, $Bi_2O_3$, $SeO_2$, $CeO_2$, $Er_2O_3$, and $Nd_2O_3$. These compounds may be used either singly or in combination.

The total content of coloring components is preferably 7% or lower. Devitrification of the glass can be suppressed by that condition. The content of a coloring component(s) is preferably 5% or lower, even preferably 3% or lower, and particularly preferably 1% or lower. When it is desired to set the visible light transmittance of the glass higher, it is preferable that substantially no coloring component be contained.

$SO_3$, a chloride, a fluoride, or the like may be contained as appropriate to serve as, for example, a refining agent at the time of glass melting. It is preferable that substantially no $As_2O_3$ be contained. Where $Sb_2O_3$ is contained, it is preferable that its content be 0.3% or lower, even preferably 0.1% or lower. It is most preferable that substantially no $Sb_2O_3$ be contained.

To suppress stress relaxation at the time of chemical strengthening, it is preferable that the glass transition temperature (Tg) of the present glass for strengthening be 480° C. or higher. To obtain large compressive stress by suppressing stress relaxation, it is even preferable that Tg be 500° C. or higher, further preferably 520° C. or higher.

To increase the ion diffusion rate during chemical strengthening, it is preferable that Tg be 700° C. or lower. To make it easier to obtain a large DOL, it is even preferable that Tg be 650° C. or lower, further preferably 600° C. or lower.

The Young's modulus of the present glass for strengthening is preferably 70 GPa or larger. When strengthened glass is broken, the glass is less prone to scatter fragments as the Young's modulus increases. Thus, the Young's modulus is even preferably 75 GPa or larger, further preferably 80 GPa or larger. On the other hand, where the Young's modulus is too large, the ion diffusion rate is low during chemical strengthening, which makes it difficult to obtain a large DOL. Thus, the Young's modulus is preferably 110 GPa or smaller, even preferably 100 GPa or smaller, and further preferably 90 GPa or smaller. A Young's modulus can be measured by an ultrasonic method.

The Vickers hardness of the present glass for strengthening is preferably 575 or larger. As the Vickers hardness of glass for chemical strengthening increases, chemically strengthened glass tends to have a larger Vickers hardness value and is less prone to be scratched when dropped. Thus, the Vickers hardness of glass for chemical strengthening is even preferably 600 or larger and further preferably 625 or larger.

The Vickers hardness after chemical strengthening is preferably 600 or larger, even preferably 625 or larger, and further preferably 650 or larger.

Although a glass becomes less prone to be scratched as its Vickers hardness increases, the Vickers hardness of the present glass for strengthening is usually 850 or smaller. Glass having too large a Vickers hardness value tends to be difficult to give sufficient ion exchangeability. Thus, the Vickers hardness is preferably 800 or smaller and even preferably 750 or smaller.

The fracture toughness value of the present glass for strengthening is preferably 0.7 MPa·m$^{1/2}$ or higher. As the fracture toughness value increases, chemically strengthened glass tends to be suppressed more in the degree of scattering of fragments when it is broken. The fracture toughness value is even preferably 0.75 MPa·m$^{1/2}$ or larger and further preferably 0.8 MPa·m$^{1/2}$ or larger.

The fracture toughness value is usually 1.0 MPa·m$^{1/2}$ or smaller. A fracture toughness value can be measured by a DCDC method (see Acta Metall. Mater., Vol. 43, pp. 3,453-3,458, 1995).

The average thermal expansion coefficient (a) of the present glass for strengthening from 50° C. to 350° C. is preferably 100×10$^{-7}$/° C. or smaller. Where the average thermal expansion coefficient (a) is small, a glass sheet is less prone to warp during glass shaping or cooling after chemical strengthening. The average thermal expansion coefficient (a) is even preferably 95×10$^{-7}$/° C. or smaller and further preferably 90×10$^{-7}$/° C. or smaller. Although as small an average thermal expansion coefficient (a) as possible is preferable to suppress warp of a chemically strengthened glass sheet, the average thermal expansion coefficient ((a) is usually 60×10$^{-7}$/° C. or larger.

In the present glass for strengthening, the temperature ($T_2$) at which the viscosity becomes equal to 10$^2$ dPa·s is preferably 1,750° C. or lower, even preferably 1,700° C. or lower, and further preferably 1,680° C. or lower. $T_2$ is usually 1,400° C. or higher.

In the present glass for strengthening, the temperature ($T_4$) at which the viscosity becomes equal to 10$^4$ dPa·s is preferably 1,350° C. or lower, even preferably 1,300° C. or lower, and further preferably 1,250° C. or lower. $T_4$ is usually 1,000° C. or higher.

EXAMPLES

Although the invention will be described below using Examples, it is not limited to them.

Glass materials were mixed so as to obtain a composition of each of glass G1 to glass G4 shown in Table 1 in mass % in terms of oxides and then subjected to weighing so that glass of 400 g was obtained. Then the mixed materials were put into a platinum crucible and melted in an electric furnace at 1,500° C. to 1,700° C. for about 3 hours, defoamed, and homogenized.

Table 2 shows compositions of these kinds of glass in mol %.

TABLE 1

| (mass %) | Glass | | | |
| --- | --- | --- | --- | --- |
|  | G1 | G2 | G3 | G4 |
| SiO$_2$ | 54.0 | 62.0 | 63.0 | 63.7 |
| Al$_2$O$_3$ | 23.0 | 20.1 | 20.5 | 20.3 |
| Li$_2$O | 4.6 | 5.2 | 5.1 | 7.9 |
| Na$_2$O | 3.5 | 4.5 | 5.8 | 0.0 |
| K$_2$O | 0.0 | 0.0 | 0.0 | 0.0 |
| ZrO$_2$ | 1.7 | 0.9 | 1.9 | 4.1 |
| MgO | 0.0 | 0.0 | 0.0 | 4.0 |
| CaO | 0.2 | 0.2 | 0.2 | 0.0 |
| Y$_2$O$_3$ | 12.8 | 6.9 | 3.5 | 0.0 |
| Li$_2$O + Na$_2$O + K$_2$O | 8.1 | 9.7 | 10.9 | 7.9 |

TABLE 2

| (mol %) | Glass | | | |
| --- | --- | --- | --- | --- |
|  | G1 | G2 | G3 | G4 |
| SiO$_2$ | 63.7 | 68.0 | 67.7 | 64.0 |
| Al$_2$O$_3$ | 16.0 | 13.0 | 13.0 | 12.0 |
| Li$_2$O | 11.0 | 11.5 | 11.0 | 16.0 |
| Na$_2$O | 4.0 | 4.8 | 6.0 | 0.0 |
| K$_2$O | 0.0 | 0.0 | 0.0 | 0.0 |
| ZrO$_2$ | 1.0 | 0.5 | 1.0 | 2.0 |
| MgO | 0.0 | 0.0 | 0.0 | 6.0 |
| CaO | 0.2 | 0.2 | 0.2 | 0.0 |
| Y$_2$O$_3$ | 4.0 | 2.0 | 1.0 | 0.0 |
| Li$_2$O + Na$_2$O + K$_2$O | 15.0 | 16.3 | 17.0 | 16.0 |

The molten glass thus obtained was put into a metal die, held at a temperature that is about 50° C. higher than a glass transition temperature for 1 hour, and then cooled to room temperature at a rate of 0.5° C./min, whereby a glass block was obtained. After the glass block was cut and ground, both surfaces of each of resulting glass sheets were finally mirror-polished, whereby glass sheets having a thickness 600 μm or 800 μm were obtained.

Glass G1 to glass G3 were subjected to 2-step chemical strengthening treatments shown in Table 3, whereby chemically strengthened glass samples of Examples 1-9 described below were manufactured. Furthermore, glass G4 was subjected to a 3-step strengthening treatment shown in Table 3, whereby chemically strengthened glass sample of Example 10 described below was manufactured. More specifically, a first strengthening treatment was performed in which each kind of glass sheet was held for a time shown in a holding time 1 row of Table 3 at a temperature shown in a temperature 1 row using a nitrate salt having a proportion (mass %) of metal ions in a molten salt shown in a sodium-containing molten salt row. Then a second strengthening treatment was performed in which each kind of glass sheet was held for a time shown in a holding time 2 row at a temperature shown in a temperature 2 row using a nitrate salt having a proportion(s) (mass %) of metal ions in a molten salt shown in a lithium-containing molten salt row, whereby each of the chemically strengthened glass samples of Examples 1-9 was obtained. After the second strengthening treatment, a third strengthening treatment was performed in which one kind of glass sheet was held for a time shown in a holding time 3 row at a temperature shown in a temperature 3 row using a nitrate salt having a proportion (mass %) of metal ions in a molten salt shown in a sodium-containing molten salt row, whereby a chemically strengthened glass sample of Example 10 was obtained. Examples 1-5 and 10 are Inventive Examples and Examples 6-9 are Comparative Examples.

[Stress Profile]

Various kinds of stress values and depths were measured using an optical waveguiding surface stress meter FSM-6000 produced by Orihara Industrial Co., Ltd. and a birefringence stress meter Abrio. In Table 3, $CS_0$ is a compressive stress value at the first surface, $CS_A$ is a compressive stress value at a depth $D_A$ from the first surface, $D_A$ is a depth at which a minimum compressive stress value appears in a depth range from the first surface to a depth $D_B$, $CS_B$ is a compressive stress value at the depth $D_B$ from the first surface, $D_B$ is a depth at which a maximum compressive stress value appears in a depth range, as measured from the first surface, of $(0.05 \times t)$ to $(0.15 \times t)$ μm, DOL is a compressive stress layer depth, and $CS_{80}$ is a compressive stress value at a depth 80 μm from the first surface. Among these values, $CS_0$ is a value that was measured with the optical waveguiding surface stress meter and $CS_A$, $D_A$, $CS_B$, $D_B$, DOL, and $CS_{80}$ are values that were measured with the birefringence stress meter. Furthermore, CT is a tensile stress value that was measured at a depth $(0.5 \times t)$ μm from the first surface with the birefringence stress meter.

Empty boxes of Examples 7 and 8 in Table 3 indicate that $CS_A$ and $CS_B$ were identical. Empty boxes of Example 9 indicate that stress values could not be measured, that is, were not measured.

[Drop Test]

A drop test was performed in the following manner. Each of glass sheets obtained measuring 120×60×0.6 mm (thickness) was fitted into a structural body whose size, mass and stiffness were adjusted to those of common, currently used smartphones to simulate a smartphone, and a resulting sample structure was dropped freely onto an SiC sandpaper of #80. If the glass sheet was not broken when it was dropped from a height 5 cm, it was dropped again from a height that was 5 cm higher than the preceding height. This act was repeated until the glass sheet was broken and an average value of a height at which the glass sheet was broken for the first time of 10 sample glass sheets was employed as a "drop height" shown in Table 3. An empty box of Example 10 in Table 3 indicates that a drop test was not performed.

[Number of Fragments]

An indenter having an angle 90° was driven into each 30 mm×30 mm square glass sheet. The number of fragments of a fracture of each glass sheet was counted and is shown in Table 3. If the number of fragments was larger than 10, it was judged that a CT limit was exceeded. An empty box of Example 10 in Table 3 indicates that the number of fragments was not measured.

[Surface Cracking]

A state of a glass surface was observed with an optical microscope immediately after chemical strengthening treatment and whether cracking occurred in the surface was checked. Results are shown in Table 3.

TABLE 3

| | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Glass | | G1 | G3 | G1 | G3 | G3 | G1 | G1 | G2 | G1 | G4 |
| Thickness | | 0.6 mm | 0.6 mm | 0.6 mm | 0.6 mm | 0.6 mm | 0.6 mm | 0.6 mm | 0.6 mm | 0.6 mm | 0.8 mm |
| First treatment | Sodium-containing molten salt | Na: 100% | Na: 100% | Na: 100% | Na: 100% | Na: 100% | Na: 100% | Na: 100% | Na: 100% | Na: 100% | Na: 100% |
| | Temperature 1 (° C.) | 450 | 450 | 450 | 450 | 450 | 450 | 450 | 450 | 450 | 450 |
| | Holding time 1 (hour) | 2 | 2 | 2 | 2 | 2 | 2 | 2 | 2 | 2 | 3 |
| Second treatment | Lithium-containing molten salt | K: 98% Li: 2% | K: 98% Li: 2% | K: 99% Li: 1% | K: 99% Li: 1% | K: 99.5% Li: 0.5% | K: 99.5% Li: 0.5% | K: 90% Na: 9% Li: 1% | K: 90% Na: 9% Li: 1% | K: 90% Na: 10% | Li: 100% |
| | Temperature 2 (° C.) | 425 | 425 | 425 | 425 | 425 | 425 | 425 | 425 | 425 | 450 |
| | Holding time 2 (hour) | 1 | 1 | 1 | 1 | 1.5 | 1 | 1 | 1 | 1 | 2.5 |
| Third treatment | Sodium-containing molten salt | | | | | | | | | | Na: 100% |
| | Temperature 3 (° C.) | | | | | | | | | | 450 |
| | Holding time 3 (min) | | | | | | | | | | 4 min |
| Stress profile | $CS_0$ (MPa) | 874.1 | 973.1 | 619.3 | 874.1 | 824.1 | 846.9 | 962.8 | 912.2 | | 452.3 |
| | $CS_A$ (MPa) | 5.0 | −32.6 | 36.3 | −12.4 | 42.9 | 63.6 | | | | 1.0 |
| | $D_A$ (μm) | 13.0 | 13.0 | 14.0 | 14.0 | 21.0 | 17.0 | | | | 40.0 |
| | $CS_B$ (MPa) | 60.4 | 24.6 | 65.6 | 32.9 | 44.0 | 80.9 | | | | 82.8 |
| | $D_B$ (μm) | 74.0 | 91.0 | 63.0 | 79.0 | 58.0 | 58.0 | | | | 97.0 |
| | DOL (μm) | 147.0 | 155.0 | 140.0 | 143.0 | 139.0 | 143.0 | 127.0 | 112.0 | | 185.0 |
| | $CS_{80}$ (MPa) | 59.9 | 23.5 | 61.4 | 32.9 | 39.0 | 74.4 | 79.0 | 20.0 | | 74.0 |
| CT (MPa) | | 110.8 | 48.9 | 122.2 | 76.6 | 102.3 | 168.4 | 202.5 | 120.0 | | 89.6 |
| Drop height (cm) | | 41.9 | 16.4 | 43.0 | 23.0 | 27.3 | 52.1 | 55.3 | 14.0 | 5.0 | |
| Number of fragments | | 9 | 4 | 10 | 6 | 8 | 13 | 16 | 10 | 6 | |
| Surface cracking after strengthening | | None | None | None | None | None | None | None | None | Occurred | None |

In Examples 6 and 7, whereas the drop height was high which means high strength, the number of fragments at the time of a fracture was larger than 10 which means a fracture causes danger.

In Example 8, the depths $D_A$ and $D_B$ from the first surface were identical and hence the drop strength is low.

In Example 9, cracks developed in the glass sheet after the second chemical strengthening. Furthermore, the drop strength was low because of this cracking and stress measurement could not be performed because glass scattered during working.

Although the invention has been described in detail by referring to the particular embodiment, it is apparent to those skilled in the art that various changes and modifications are possible without departing from the spirit and scope of the invention. The present application is based on Japanese Patent Application No. 2020-003802 filed on Jan. 14, 2020 and No. 2020-149919 filed on Sep. 7, 2020, the disclosures of which are incorporated herein by reference.

The invention claimed is:

1. A chemically strengthened glass article comprising a first surface, a second surface opposed to the first surface, and end portions that are in contact with the first surface and the second surface, wherein:
   a compressive stress value at the first surface is 400 MPa or more;
   when a compressive stress value inside the glass article is expressed with a depth from the first surface as a variable, a compressive stress value at a depth $D_B$ is larger than a compressive stress value at a depth $D_A$, provided that
   the compressive stress value at the depth $D_A$ is 42.9 MPa or less;
   the depth $D_B$ is a depth at which a compressive stress value is maximum in a depth range, as measured from the first surface, of $(0.05 \times t)$ μm to $(0.15 \times t)$ μm where t (μm) is a glass thickness, and the depth $D_A$ is a depth at which a compressive stress value is minimum in a depth range from the first surface to the depth $D_B$;
   a tensile stress value at a depth $(0.5 \times t)$ μm from the first surface is 125 MPa or less; and
   a compressive stress layer depth is $(0.23 \times t)$ μm or more.

2. The chemically strengthened glass article according to claim 1, wherein the compressive stress value at the depth $D_A$ is greater than 0 MPa.

3. The chemically strengthened glass article according to claim 1, wherein the compressive stress value at the first surface is 800 MPa to 1,200 MPa.

4. The chemically strengthened glass article according to claim 1, wherein a compressive stress value $CS_{80}$ at a depth 80 μm from the first surface, measured in MPa, is equal to or greater than $(t \times 0.1)$, where t is the glass thickness measured in μm.

5. The chemically strengthened glass article according to claim 1, wherein the glass thickness t is 200 μm to 2,000 μm.

6. The chemically strengthened glass article according to claim 1, comprising lithium aluminosilicate glass.

7. The chemically strengthened glass article according to claim 6, comprising a glass composition in a central portion in a thickness direction, comprising, in mass % in terms of oxides,
   $SiO_2$: 50% to 70%;
   $Al_2O_3$: 5% to 30%;
   $B_2O_3$: 0% to 10%;
   $P_2O_5$: 0% to 10%;
   $Y_2O_3$: 0% to 10%;
   $Li_2O$: 3% to 15%;
   $Na_2O$: 0% to 10%;
   $K_2O$: 0% to 10%;
   $(MgO+CaO+SrO+BaO)$: 0% to 10%; and
   $(ZrO_2+TiO_2)$: 0% to 5%.

8. A method of manufacturing the chemically strengthened glass article of claim 1, the method comprising:
   immersing a glass sheet comprising lithium aluminosilicate glass in a sodium-comprising molten salt at 380° C. to 500° C. for 1 to 8 hours, wherein the sodium-comprising molten salt comprises sodium ions at 50 mass % or more with respect to a mass of metal ions in the sodium-comprising molten salt regarded as 100%; and
   thereafter immersing the glass sheet in a lithium-comprising molten salt.

9. The manufacturing method according to claim 8, wherein the lithium aluminosilicate glass comprises, in mass % in terms of oxides,
   $SiO_2$: 50% to 70%;
   $Al_2O_3$: 5% to 30%;
   $B_2O_3$: 0% to 10%;
   $P_2O_5$: 0% to 10%;
   $Y_2O_3$: 0% to 10%;
   $Li_2O$: 3% to 15%;
   $Na_2O$: 0% to 10%;
   $K_2O$: 0% to 10%;
   $(MgO+CaO+SrO+BaO)$: 0% to 10%; and
   $(ZrO_2+TiO_2)$: 0% to 5%.

\* \* \* \* \*